Feb. 24, 1959 L. N. RIDENOUR 2,875,269

VIDEO SCRAMBLING AND UNSCRAMBLING SYSTEM

Filed April 8, 1954 2 Sheets-Sheet 1

LOUIS N. RIDENOUR,
INVENTOR.
BY Lyon & Lyon
ATTORNEYS

VIDEO SCRAMBLING AND UNSCRAMBLING SYSTEM

Filed April 8, 1954 2 Sheets-Sheet 2

LOUIS N. RIDENOUR,
INVENTOR.

BY [signature]

ATTORNEYS

United States Patent Office 2,875,269

Patented Feb. 24, 1959

2,875,269

VIDEO SCRAMBLING AND UNSCRAMBLING SYSTEM

Louis N. Ridenour, Los Angeles, Calif., assignor to International Telemeter Corporation, Los Angeles, Calif., a corporation of Delaware Application April 8, 1954, Serial No. 421,924

9 Claims. (Cl. 178—5.1)

This invention relates generally to television systems and, more particularly, to improvements in methods of and apparatus for scrambling a television transmission, so that it is made intelligible only by a receiver equipped with suitable unscrambling apparatus.

The recent growth of the television industry and recent experience in television broadcasting indicates that the broadcasting of television entertainment cannot be carried forward on a profitable basis if reliance is placed solely on advertising revenues for defraying the costs of producing and transmitting such entertainment. These factors demonstrate the need for a television transmitting and receiving system which allows each televiewer to be charged for the particular program received on the individual television receivers. Charging for entertainment in this fashion is analogous to the purchase of tickets at the box office of a theater or like place of entertainment, and this analogy has led to recent adoption of the term "box-office television" to describe television systems of this character.

A number of box-office television systems, alternatively known as subscription television systems, have already been described. In one system scrambled, or coded, entertainment material is broadcast in such form as to be unintelligible when received on an ordinary television receiver. Authorized receiving stations are fitted with an unscrambling, or decoding, apparatus which is capable of rendering intelligible the otherwise unintelligible transmissions. This decoding or unscrambling apparatus is controlled by key signals transmitted to the individual receiving stations over the commercial telephone systems, and a charge for supplying the key or control signal is made, the key signal being supplied by a telephone operator only upon request therefor by the subscriber, and the charge being made as an incident to supplying such a key signal upon request.

One of the outstanding disadvantages of a box-office television system of the character described above resides in the necessity for using land lines extending in a network telephone type system from the television transmitting station to each of the television receiving stations, and the necessity for using special switchboard equipment and operating personnel to staff such equipment and make the necessary charges for supplying the key signal.

Another type of box-office television system utilizes a physical key or card which takes the place of the land line used in the system described above. In the physical key or card type system, considerable difficulty would normally be encountered in effecting the distribution of the keys or cards to the many potential users of the system.

The disadvantages of the box-office television systems just mentioned are largely obviated in box-office television systems of the types described in an application filed on January 19, 1950, by David L. Loew et al., Serial Number 139,358, now Patent No. 2,769,023, for Prepaid Entertainment Distribution System and in another application by Robert E. Gottfried et al. filed May 10, 1951, Serial Number 225,651, now Patent No. 2,769,026 for Improvement In Prepaid Entertainment Distribution System, both applications being assigned to this assignee. The systems disclosed in said copending applications utilize a coin collection means at each receiving station and place the unscrambling apparatus under the control of the coin collection mechanism. This obviates the necessity of employing land lines or physical keys for controlling the operation of the unscrambling apparatus. As in the systems described in said copending applications, the operation of the unscrambling mechanism results from the deposit of the coins in the coin collecting apparatus.

An essential feature of any box-office television system is the provision of the coding or scrambling apparatus at the transmitting station and the provision of co-operating decoding or unscrambling apparatus at each of the receiving stations. Such apparatus for maintaining the secrecy of the programs until the necessary price has been paid or the corresponding charge is made must so operate as to render the transmitting signals unintelligible when received on an ordinary television receiver not equipped with the decoding or unscrambling apparatus. The scrambled signals must be of such character as to be capable of being rendered intelligible by means of relatively simple apparatus to be installed at each of the receiving stations. Furthermore, the type of secrecy afforded by the system must be substantially foolproof so as to make substantially impossible the unauthorized reception of the programs without the payment of the price charged for such entertainment. This latter requirement preferably is met by periodically varying the conditions of the coding or scrambling so as to require the unscrambling apparatus at each of the television receivers to be responsive to a control exercised at the transmitting station.

The present system employed for transmitting an image on television is to scan an object in interlaced fashion. Thus a complete picture frame, representative of an optical image at a certain instant, is composed of two fields of consecutively scanned parallel lines arranged so that the lines of one field fall between the lines of another field.

In a patent to Mayle, No. 2,472,774, there is described a system for effecting secrecy in television systems wherein a commutating tube is provided for generating pulses of irregular amplitude which are superimposed upon the sawtooth deflection voltage which is applied as a vertical deflection voltage. This composite wave is then applied to the vertical deflection coils of the television camera. This has the effect of transmitting a picture wherein the interlace of the horizontal lines is not in sequence but is irregular, as determined by the different pulse amplitudes. A similar system is provided at the receiver to permit decoding.

The present invention also operates on the principle of providing an irregular sequence for horizontal scanning of successive fields in a television system. The present invention, however, achieves this result in a new and useful manner and without the necessity for adding two waves. The addition of waves always presents alignment problems, that is, the points wherein two waves are added must always be the same. This is difficult to achieve in practice with a high degree of precision.

Furthermore, the present invention is directed to a television picture scrambling and unscrambling system which is particularly suitable for use with box-office television systems of the type described in the aforementioned applications.

It is an object of the present invention to provide a novel and useful video scrambling and unscrambling apparatus and system suitable for use in a subscriber television system.

It is still another object of the present invention to provide an improved video scrambling and unscrambling apparatus and system which permits simple alterations of the scrambling and unscrambling apparatus to change their operation sequence pattern, thereby preserving secrecy.

It is a further object of the present invention to provide an inexpensive video scrambling and unscrambling apparatus for subscriber television use which enables preservation of secrecy.

Yet another object of the present invention is the provision of a coding and decoding system for television programs wherein all signals required are provided by the transmitted program signals without the use of auxiliary channels for decoding signals.

The above objects as well as other features of this invention are achieved by providing a system wherein horizontal sync pulses are counted by a binary counter which establishes a different voltage pattern for each count. Each different voltage pattern is used to generate a different value of vertical deflection current for the video camera. The value of vertical deflection currents selected by the counts may be changed by a simple switching arrangement. At each subscriber's television receiver there is located the same apparatus as is located at the transmitter for counting and decoding horizontal sync pulses. Since the order of the vertical deflection currents being generated is the same, the picture presented on the cathode-ray tube of the subscriber is intelligible. Should the switch arrangement at either receiver or transmitter be different or should a receiver not be equipped with the counter and current generating apparatus, the picture presented on a receiver cathode-ray tube is scrambled.

The features of the invention which are believed to be new are set forth with particularity in the appended claims. The invention itself, however, together with further objects and advantages thereof, may best be understood by reference to the following description, when taken in conjunction with the accompanying drawings, in which:

Figures 1, 2, 3:
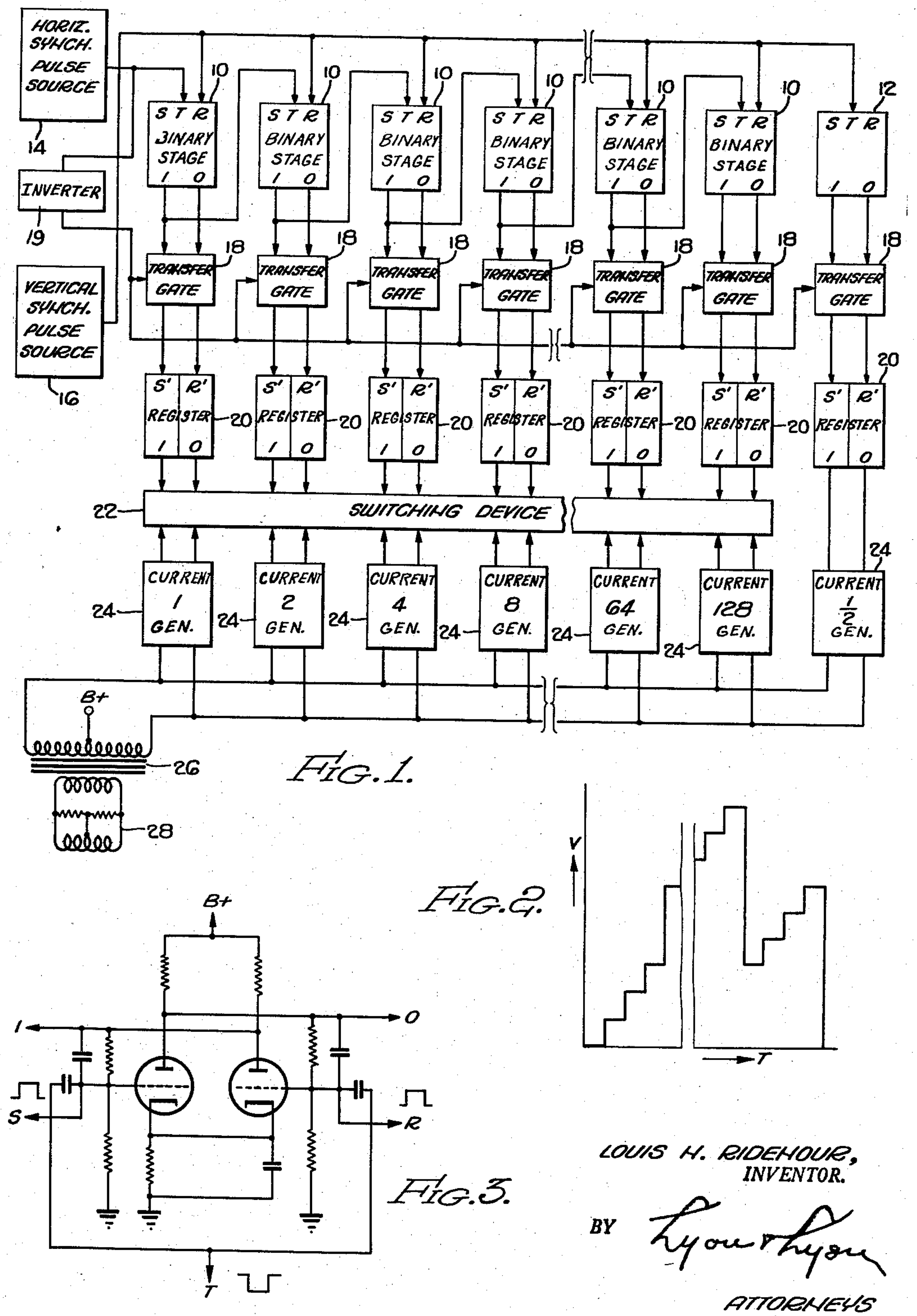
Figure 1 is a schematic diagram of one embodiment of this invention.
Figure 2 is a wave shape diagram of a typical yoke current waveform which is obtainable with the present invention.
Figure 3 is a circuit diagram of a binary counter stage employed in Figure 1.

As briefly described previously, the system used in transmission of television pictures is to scan the object with a number of lines in each field and to interlace the lines to present a frame. Thus, if the lines in the first field were to be numbered 1, 3, 5, 7 . . ., the lines in the second field would have the numbers 2, 4, 6, 8 . . ., and, due to the nature of the phosphor on a television tube and persistence of vision, the observer would see a picture composed of lines 1, 2, 3, 4. . . . If one were to transmit in order line 1, then line 5, line 9, line 7, and then, in the second field, transmit lines in the sequence 2, 6, 8, 4, an effective scrambling arrangement would be obtained. This occurs since a receiver not equipped with unscrambling apparatus would present these lines in the sequence in which they are received in positions normally occupied by lines 1, 2, 3, 4 . . ., and thus a scrambled picture is effectuated. A receiver with the unscrambling equipment would receive these lines and present them properly positioned on the television tube so that an intelligible picture is seen.

Referring to Figure 1, there may be seen a schematic diagram of apparatus for providing such an irregular scanning sequence. It consists of a binary counter which has at least eight binary stages 10 (only six of which are shown) plus an extra stage 12. Each of these binary stages is the well known two-tube flip-flop circuit which has three inputs. A set input terminal is designated as "S" which, when positive pulses are applied, provides an output from one of the tubes, which can be called the "1" output. A reset input terminal is provided, designated as "R" to which the application of a positive pulse causes an output to be obtained from the other tube of the binary stage, which may be designated as the "0" output. A third input terminal of the flip-flop is called a trigger input, designated as "T." Negative pulses applied thereto have the effect of transferring the flip-flop from a "1" to a "0" output condition, or a "0" to a "1" output condition, depending upon which condition prevails at the time the pulse is applied to the "T" input. As shown in Figure 1, horizontal sync pulses from the sync pulse source 14 are applied to the "T" input of the first binary stage. The "1" output of the first binary stage is applied to the "T" input of the second binary stage. Connections between second and third binary stages, similarly, are from the second stage "1" output to the third stage "T" input. This interconnection is employed through the eight flip-flop stages.

The output from a vertical sync source 16 is applied to all the "R" terminals of all stages but the last or extra stage. The connection is made to the "T" terminal of the last stage. Thus, in operation, horizontal sync pulses are counted in a binary manner and the counter is reset every time a vertical sync pulse occurs.

The extra flip-flop 12, however, is transferred from its "1" to its "0" condition and back in succession in response to pulses from the vertical sync pulse source.

The output of each one of the flip-flop stages is applied to an associated transfer gate 18. Each gate also receives a horizontal sync pulse by way of an inverter 19, which inverts the polarity of the pulse. The transfer gate outputs are respectively applied to the input terminals of a binary flip-flop register 20. These terminals are designated respectively as S′, R′, and the outputs again are correspondingly designated as "1" and "0." A transfer gate operates to place its associated register stage in the same condition as the trigger stage coupled to its input each time a pulse is received from the horizontal sync pulse source. The outputs of all but the last of the register stages are applied in any desired arrangement through a switching device 22 to the inputs of associated current generators 24. If desired, a switch or a plug board may be used to effectuate the desired connections. Each one of the current generators 24 generates current which has an amplitude which is in binary relationship to the amplitude of the current generated by the other current generators. In other words, the relationship is in the order 1, 2, 4, 8, 16, 32. The last current generator 24 which is only associated with the extra stage 12 of the counter has current which has the value "½."

The outputs of the current generators are connected in push-pull fashion to the primary of a transformer 26. The secondary of this transformer is connected to the vertical deflection yoke 28 of the camera if the apparatus is being used at the transmitter. If the apparatus is being used at the receiver, the output of the transformer is connected to the vertical deflection yoke of the receiver tube.

The operation of the system is as follows: Pulses from the horizontal sync source are counted. At each pulse the register staticises or converts to D. C. levels the count of the counter. Depending upon the pattern of the staticised voltages and also upon the interconnection with the current generators, there is a different current applied to the vertical deflection coil with each different count.

A typical yoke current may be seen in Figure 2. It will be appreciated that there are in effect different pulses having pulse amplitudes directly representative of the count in the counter which are applied to the vertical deflection yoke. The last or extra flip-flop stage provides the interlace feature, since when it is in the "1" condition the "½" current generator provides curent flowing in one direction to the output transformer and when the extra stage is triggered to its other condition the "½" current generator applies its current in reverse to the output transformer. Since this last stage maintains its condition during the interval of a field, it will be appreciated that, although the pulse amplitudes provided from the remaining portion of the apparatus is the same at every corresponding instant within a field, the operation of the last stage is the factor which shifts the pulse amplitudes within each field sufficiently to provide the interlace feature. It should also be noted that the current applied to the yoke remains constant during the interval of a horizontal scanning line.

The number of variations possible with the apparatus shown is extremely large, approximately $10^7$. The identical apparatus is used at the receiver as an unscrambling system. All that is required is that the switching device 22 be set so that the interconnections between the current generators and the register be the same for the transmitter and the receiver. The type of switch which is used to connect the register and the current generators may be a manually settable one or a solenoid operated arrangement which can be actuated by signals such as pulses transmitted from the transmitter and received and separated by any suitable means at the subscriber receiver or even electron-tube switches. Thus changes can be made periodically to transfer the interconnections of the coding and decoding apparatus to maintain and further assure secrecy in operation. It is to be noted that no other apparatus than the one shown is required by this system, nor are any other auxiliary communication facilities required.

Another advantage afforded by this invention in its application to subscription television systems of the type previously described is that it enables the transmission of programs to selected groups of subscribers without other groups being able to receive them. Furthermore, this invention enables elimination of undesirable or delinquent subscribers. As an example, if there are a group of subscribers to whom only certain subject matter is to be shown, such as medical subject matter to doctors, or a special series of lectures for selected students, then by merely setting the switches at the transmitter and, correspondingly, at the various receivers of the interested subscribers only the selected group will receive the programs and none other. Where a subscriber does not subscribe to a sufficient number of programs or periodic access to his home is not obtained for collection of the coin box contents in the box-office television system of the types described in the previously cited applications, then upon a change in the switch settings at the transmitter and no corresponding change being made by a coin box collector in the unaccessible or delinquent subscriber's receiver, the subsequently transmitted programs are unintelligible as far as this class of subscriber is concerned. Upon such a subscriber permitting the required access to his receiver, the switches can be set to the current code.

Figure 3 is a circuit diagram of a flip-flop which may be used in the binary counter. It consists of the well-known Eccles-Jordan type of trigger circuit, which may be found described, for example, on pages 595–597 of Radio Engineering by Terman, published by the McGraw-Hill Book Company. The terminals of the trigger circuit are labeled in accordance with the terminal identifications used in the schematic diagram in Figure 1. In view of the well-known operation of this type of trigger circuit, a further description is deemed unnecessary.

Figure 4:
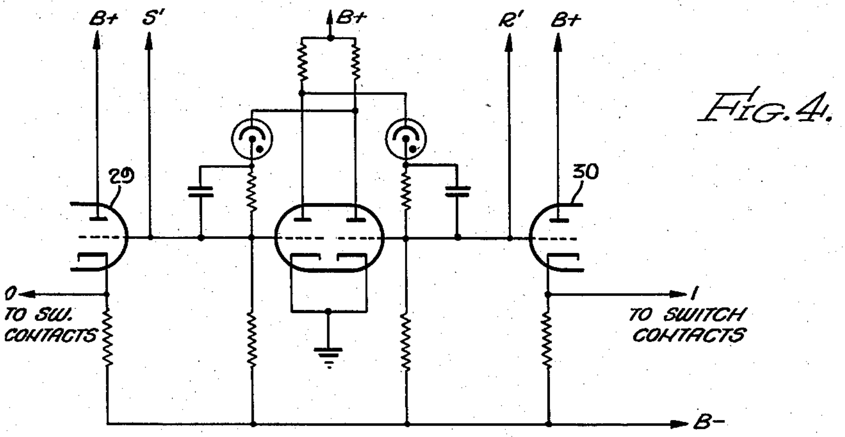
Figure 4 is a circuit diagram of a binary register stage employed in Figure 1.

Figure 4 is a circuit diagram of a flip-flop circuit which is suitable for use as a stage in the binary register shown in Figure 1. Here, again, there is shown another form of the two-tube trigger circuit which is well known in the field. The output of each stage is applied to a cathode follower 29, 30, and the outputs taken from each of these cathode followers are applied to switch contacts in the switching device 22, from which they are interconnected in any desired coding arrangement to the various current generators. The operation of this trigger circuit is also too well known to merit further discussion and is also found in the previous reference, as well as others. The input and output terminals have applied thereto the same identification letters as are used in Figure 1, in order to facilitate the identification thereof.

Figure 5:
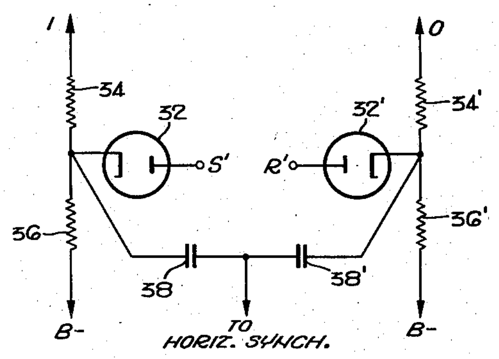
Figure 5 is a circuit diagram of a transfer gate employed in Figure 1.

Reference is now made to the circuit diagram of a transfer gate which is shown in Figure 5. The terminals of the circuit in Figure 5 have the same reference numerals applied thereto as are shown in Figure 1, to facilitate the understanding thereof. The transfer gate consists of two diodes 32, 32′, one of which has its anode coupled to the S′ terminal of a register flip-flop, the other of which has its anode coupled to the R′ terminal of the same flip-flop stage. The cathodes of these two tubes are respectively coupled through individual resistors 34, 34′ to the "1" and "0" output terminals of a counter flip-flop stage and also through individual resistors 36, 36′ to a source of negative voltage. Two condensers 38, 38′ are used to couple the cathodes of these diodes to the source of horizontal sync pulses. Accordingly, if it is assumed that the "1" output of a flip-flop stage is high and the "0" output is low, when a horizontal sync pulse is applied to the cathodes of both diodes they simultaneously are cut off, but when the sync pulse terminates the anodes of both diodes assume substantially the potentials at their cathodes. Thereby, the R terminal is made low if it is not already low, with the result that the S′ terminal is made high. Thereby, the grids of the register stage have potentials applied which transfer the register into the same condition as the associated counter stage. In this manner, each time the counter assumes a new count, this is transferred into the register at the termination of the pulse being counted.

Figure 6:
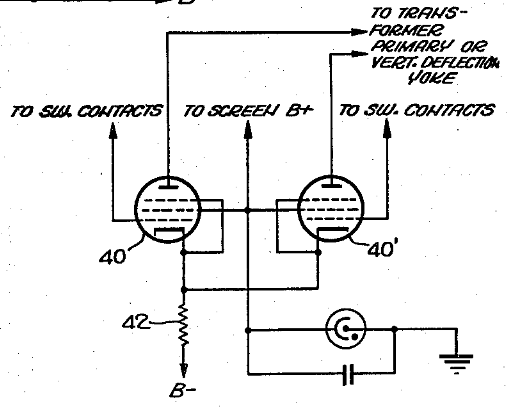
Figure 6 is a circuit diagram of a current generator employed in Figure 1.

Referring now to Figure 6, there may be seen a circuit diagram of the current generator. This consists of two tubes 40, 40′ having their cathodes connected together and through a current-limiting resistor 42 to a source of negative biasing potential. This current-limiting resistor 42 has its value selected so that the binary relationships of each one of the current generators is preserved. In other words, the resistor for the first current generator permits current to flow when the tubes receive the proper signals at their control grids, which current corresponds to the unit "1." The next current generator has two tubes with a common cathode resistor which permits twice as much current to flow, etc.

It is to be noted that the plates of the two tubes are denoted as being respectively connected to the ends of the output transformer. In this manner, a push-pull current is applied with push-pull grid signals. If it is desired to eliminate the transformer, the plates of one of the two tubes in each of the current generators can be connected across the deflection yoke. B+ can be applied to these plates through the vertical deflection yoke, which thus acts as a summing device. B+ is applied directly to the plate of the other tube. Accordingly, either the single-ended or double-ended method may be used, but the double-ended method is the preferred embodiment.

In operation, each generator in the push-pull embodiment applies currents, the polarities of which are determined by the signals applied from the register. These currents are algebraically combined in the output transformer 26 to provide a resultant deflection current, as may be seen in Figure 2. In the single-ended embodiment, a simple addition of the currents occurs in the deflection yoke.

Figure 7:
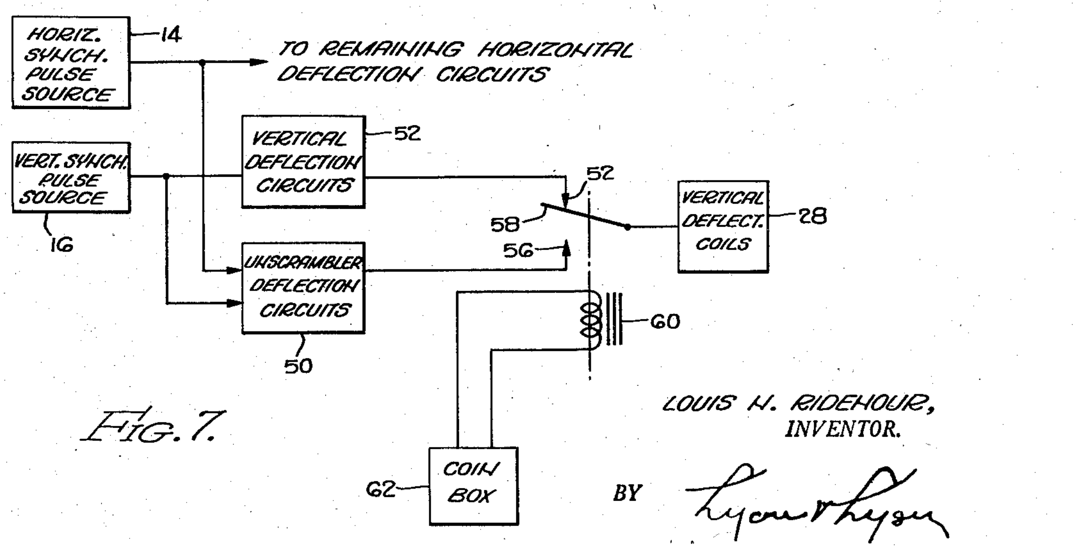
Figure 7 is a schematic diagram showing the modification of a receiver required to incorporate the embodiment of the invention.

Figure 7 is a schematic diagram showing how the embodiment of the invention may be inserted into the television receiver of a subscriber to a subscription television system so that both free and paid programs may be seen. Connections are brought out from the horizontal and vertical sync pulse sources 14, 16 to the unscrambler deflection circuits 50 which represents the embodiment of the invention shown in Figure 1. The output from the vertical and horizontal sync pulse sources also are connected to the usual horizontal and vertical deflection circuits 52 in the receiver. The vertical deflection circuit output and the digital deflection circuit output are connected to two fixed relay contacts 54, 56. The movable contact 58 of the relay 60 is normally closed with the contact connected with the vertical deflection circuits of the receiver. The movable contact connects to the vertical deflection coils 28 of the receiver. Thus free programs are received and seen in an unaffected manner. A coin box 62 is shown which is connected to the relay coil. A coin box of a suitable type, as well as its associated apparatus, is described in both of the previously mentioned applications, to Loew et al. and to Gottfried et al. If the receiver is tuned to a channel in which a program of a type for which payment is required is being transmitted by transmission of suitable signals the coin box is actuated to show the amount of payment required. If such payment is not made by depositing the required amount of coins in the coin box, the picture received is a scrambled one and, hence, unintelligible. Upon depositing the required amount of coinage in the coin box, the coin box serves to actuate the relay and the unscrambling deflection circuits are permitted to unscramble the picture being received. Upon cessation of the program, the coin box is reset to its initial position, the relay is rendered inoperative, and the receiver is again in condition to receive free programs.

Accordingly, there has been described and shown herein new and improved systems for scrambling a transmitted television program and for unscrambling it at the receiver. The systems shown herein permit, with a minimum of difficulty, a large number of scrambling codes and also permit the changing of such codes with a minimum of difficulty.

I claim:

1. A scanning system for determining the order of scanning horizontal lines in successive scanning fields of a television system comprising first electron deflecting means including a source of horizontal synchronizing signals for defining the horizontal component of a scanning trace, and second electron deflecting means for defining the vertical component of said scanning trace including a pulse counter having a plurality of electron discharge tubes, different counts being manifested by conduction and nonconduction of said tubes in different patterns, means to select output from different tubes in said counter, means responsive to the conduction and non-conduction of the tubes the output from which has been selected to provide vertical deflection currents having an amplitude determined by said conduction and nonconduction pattern, and means to apply said horizontal synchronizing signals to said pulse counter to be counted.

2. A scanning system as recited in claim 1 wherein said counter is a binary counter including a plurality of binary stages with two tubes in each stage, said means to select output from different tubes in said counter includes switch means to select an output from either of the tubes in each stage, and said means to provide vertical deflection signals having an amplitude determined by said tube conduction and nonconduction pattern includes a separate current control means for each binary stage coupled to said switch to establish the current provided for each stage in binary relationship with the current provided by the other stages, and means to add all the currents from said current control means.

3. A scanning system for determining the order of scanning horizontal lines in successive scanning fields of a television system comprising first electron deflecting means including a source of horizontal synchronizing signals for defining the horizontal component of a scanning trace, a second electron deflecting means for defining the vertical component of said scanning trace including means to generate a signal at the end of each field, a binary counter having a number of concatenated binary stages, a separate binary stage, each of said binary stages having two conditions of stability, means to couple horizontal synchronizing signals from said source to said counter to be counted, means to apply signals from said means to generate a signal at the end of each field to reset said counter and to said separate binary stage to be counted, a plurality of current generators, means to selectively couple the output from each counter binary stage when in one condition of stability to a different current generator to cause it to generate current responsive thereto, and means to combine the generated currents to provide varying amplitude vertical deflection signals which determine the order of interlace in accordance with the selective coupling of said counter and said current generators.

4. A scanning system as recited in claim 3 wherein each current generator comprises an electron discharge tube having a current determining resistor in series therewith.

5. A scanning system for determining the sequence of scanning horizontal lines in successive scanning fields of a television system comprising first electron deflecting means including a source of horizontal synchronizing signals for defining the horizontal component of a scanning trace, second electron deflecting means for defining the vertical component of said scanning trace including means to generate a signal at the end of each field, a binary counter having a plurality of concatenated binary stages, a separate binary stage, each of said binary stages having two conditions of stability, a binary register having a plurality of binary register stages each of which has two conditions of stability and is associated with a different one of said binary stages, transfer gate means coupling a binary stage with an associated binary register stage to transfer it to the same stable condition as said binary stage, means to couple horizontal synchronizing signals from said source to said binary counter to be counted, means to apply signals from said means to generate a signal at the end of each field to reset said counter and to said separate binary stage to be counted, means to couple horizontal synchronizing signals from said source as gating pulses to said transfer gate means, a plurality of current generators each of which generates a different current, means to selectively couple the output from each register binary stage to a different current generator to cause it to generate current responsive thereto, and means to combine the generated currents to provide varying amplitude vertical deflection signals which determine the order to interlace in accordance with the selective coupling of said register and said current generators.

6. A scanning system as recited in claim 5 wherein each current generator comprises a first and second electron discharge tube each having an anode, control grid and cathode, a current determining resistor having one end connected to the cathodes of said first and second electron discharge tube, the value of said resistor being different for each current generator, said means to combine the generated currents comprises a transformer having a center tapped primary, means coupling all the anodes of said first tubes of every generator to one end of said transformer primary, means coupling all the anodes of said second tubes to the other end of said transformer primary, and means to apply an operating potential to said transformer center tap.

7. The combination with a television transmitting system of a television picture scrambling system comprising first electron deflecting means including a source of horizontal synchronizing signals for defining the horizontal component of a scanning trace, second electron deflecting means for defining the vertical component of said scanning trace including means to generate a signal at the end of each field, a binary counter having a number of concatenated binary stages, a separate binary stage, each of said binary stages having two conditions of stability, means to couple horizontal synchronizing signals from said source to said counter to be counted, means to apply signals from said means to generate a signal at the end of each field to reset said counter and to said separate binary stage to be counted, a plurality of current generators, means to selectively couple the output from each register binary stage when in one condition of stability to a different current generator to cause it to generate current responsive thereto, and means to combine the generated currents to provide varying amplitude vertical deflection signals which determine the order of interlace in accordance with the selective coupling of said counter and said current generators.

8. In a subscription television system including a television transmitter having horizontal and vertical synchronizing signal generators and a receiver, means at said transmitter for scrambling the video portion of a program for which payment of coin is required comprising a counter including a plurality of stages wherein each count provides a different voltage pattern for said stages, means to apply horizontal synchronizing signals from said generator to be counted, means to reset said counter responsive to vertical synchronizing signals from said generator, means to generate different vertical deflection currents responsive to said different voltage patterns of said counter, means responsive to said vertical synchronizing signals to alter said different vertical deflection currents during each field to provide for interlace, switch means between said counter and said vertical deflection current means to select a desired sequence for said different vertical deflection signals, means at said receiver for unscrambling said scrambled video portion including a counter substantially similar to the one at said transmitter means to apply received horizontal synchronizing signals to said receiver counter to be counted, means to reset said counter responsive to received vertical synchronizing signals, means to generate different vertical deflection currents responsive to different voltage patterns of said counter, means responsive to said received vertical synchronizing signals to add a fixed current to said different vertical deflection currents during alternate fields to provide for interlace, means between said counter and said vertical deflection current means to establish the same sequence for said vertical deflection currents as at said transmitter, means to establish a coin demand at said receiver for said program, normally inoperative means to permit utilization of said vertical deflection currents, and means responsive to payment of said coin demand to operate said normally inoperative means to permit utilization of said vertical deflection currents.

9. In a receiver having vertical and horizontal synchronizing signal generating circuits for a subscription television system of the type wherein a program for which payment is required has the video portion scrambled by rearranging the order of the horizontal lines, means for unscrambling said video portion comprising a pulse counter having a plurality of electron discharge tubes, different counts being manifested by conduction and nonconduction of said tubes in different patterns, means to apply horizontal synchronizing pulses from said generating circuits to said counter to be counted, means to apply vertical synchronizing pulses from said generating circuits to reset said counter, means to select output from different tubes in said counter, means responsive to the conduction and nonconduction of the tubes the output from which has been selected to provide vertical deflection currents having an amplitude determined by said conduction and nonconduction pattern, said means to select output being adjustable to select output to provide vertical deflection currents in the same order as the rearranged order of the horizontal lines at the transmitter, means responsive to said vertical synchronizing pulses from said generator to add a fixed current to said different vertical deflection currents during alternate fields to provide for interlace, means to establish a payment demand for said program at said receiver, normally inoperative means to permit utilization of said vertical deflection currents, and means responsive to payment of said coin demand to operate said normally inoperative means to permit utilization of said vertical deflection currents.

References Cited in the file of this patent

UNITED STATES PATENTS

| | | |
|---|---|---|
| 2,472,774 | Mayle | June 7, 1949 |
| 2,678,347 | Clothier | May 11, 1954 |
| 2,757,226 | Zworykin | July 31, 1956 |

FOREIGN PATENTS

| | | |
|---|---|---|
| 15,789/34 | Australia | Jan. 19, 1934 |